Patented Oct. 30, 1923.

1,472,344

UNITED STATES PATENT OFFICE.

AUGUSTE VASSEUX, OF ST.-MANDÉ, FRANCE.

PROCESS FOR THE PREPARATION AND USE OF FOOD SUBSTANCES FOR VEGETABLES, MUSHROOMS, BACTERIAS, YEAST, MOLDS, MUCORS, AND THE LIKE.

No Drawing.  Application filed July 14, 1920. Serial No. 396,279.

*To all whom it may concern:*

Be it known that I, AUGUSTE VASSEUX, a citizen of the French Republic, residing at St.-Mandé, 6 Rue de l'Epinette, Seine, in State of France, have invented certain new and useful improvements in process for the preparation and use of food substances for vegetables, mushrooms, bacterias, yeasts, molds, mucors, and the like; and I do hereby declare the following to be a full, clear, and exact description of the invention, such as will enable others skilled in the art to which it appertains to make and use the same.

The present invention relates to an improved process for increasing the useful output of fermentation. By the practice of this invention in an ordinary distillery, an increased output of alcohol can be had from a given weight of sugar amounting to one and six tenths percent or more. Also the fermentation is rendered more active. A like improvement is achieved where the object of the process is the production of yeast.

When ferments or mucors are applied to the production of alcohol by the ordinary processes hitherto employed, a certain quantity of the sugar, maltose, etc., upon which these ferments feed is consumed in supplying the growth of the ferment itself, instead of being converted into alcohol and carbonic acid.

The principal object of the present invention is the avoidance of this loss by supplying a food for the ferments which satisfies the requirements of their growth, thus releasing a material proportion of the sugar, maltose etc. for production of alcohol.

In any event the object is to substitute for the purpose of the growth of the ferment a cheaper material than sugar, thus leaving the sugar or other carbohydrates available for production of alcohol.

When the invention is practiced with molasses, grains, beets, fruits, potatoes, etc., sixty or seventy pounds or more of yeast can be produced for each one hundred pounds of sugar, while still obtaining a high alcohol output.

The expression "humic" substances covers ulmin, ulmic acids, humin, humic acids and their congeners, together with the soluble salts of these acids, whether found in nature or otherwise.

A great variety of vegetable substances may be used as raw material, among which are preferred, for cheapness and general availability, grain or malt residues, mixed with grain or bran—fruit dregs and refuse—wine press residues—vine branches—beet tops—potatoes—Jerusalem artichokes—chestnuts—beech nuts—flax sprays—bran—straw—tan residues—sawdust—seaweed—molasses residues.

These materials are treated in any well known manner for the production of humic substances. Hydrochloric, sulphuric and sulphurous acids, as well as certain bisulphites and bisulphates are used for this purpose in proportions and in a manner depending upon the raw materials used. This is already well known. Any artificial process will, of course, be unnecessary when the humic substances are already available in a natural state.

The following specific steps, employed where molasses residues are used, are given as an example of the preferred form of the process, but the invention is, of course, not limited to the details herein set forth.

The humic substances are first brought into a throughly homogeneous condition by being mixed with hot water and treated in a pug mill, after which the molasses residues are mixed therewith while still continuing the pug mill treatment. At this stage the temperature should be kept at about 80 to 90 degrees centigrade. The solution of the humic substances is insured by the temperature employed as well as by the presence of the alkaline salts in the molasses residues. The humic substances are present in the proportion of about thirty to fifty percent of the molasses residues, varying with the nature and age of the former.

The solution being completed after about one hour of this treatment, the whole mass is filtered in an ordinary filter press, the liquid resulting being charged with materials of a nature highly favorable for the production of ferments or mucors.

This liquid is preferably diluted with cold water so as to obtain a density of about 1040 at a temperature of 30 degrees centigrade; after which the pure yeast or other ferment is introduced and air is blown into the liquid.

The ferments or mucors are thus very rapidly developed, obtaining, for instance, for yeast as used in bakeries, as much as 58 or 60 per cent by weight of the soluble material employed.

What is claimed is—

1. The process of producing alcohol and ferments which consists in carrying on the process of fermentation in a mixture containing humic substances adapted to promoting the growth of the ferment used, whereby the carbohydrates used are available in larger proportion for the production of alcohol.

2. The process of producing a medium for fermentation which consists in mixing humic substances in solution with a liquid containing carbohydrates fit for fermentation.

3. An improved medium for producing alcohol and ferments by fermentation consisting of a mixture of carbohydrates and humic substances adapted to promote the growth of ferments.

In testimony whereof I affix my signature in presence of two witnesses.

AUGUSTE VASSEUX.

Witnesses:
CLEMENT S. EDWARDS,
COURTAILLE.